United States Patent [19]
Aron

[11] Patent Number: 4,723,404
[45] Date of Patent: Feb. 9, 1988

[54] HAYMAKING MACHINE EQUIPPED WITH RAKING WHEELS

[75] Inventor: Jerome Aron, Bouxwiller, France

[73] Assignee: Kuhn S.A., Saverne, France

[21] Appl. No.: 861,988

[22] Filed: May 12, 1986

[30] Foreign Application Priority Data

May 21, 1985 [FR] France ............................ 85 07825

[51] Int. Cl.$^4$ ............................................ A01D 79/00
[52] U.S. Cl. .................................................... 56/370
[58] Field of Search ................... 56/216, 370, 228, 397

[56] References Cited

U.S. PATENT DOCUMENTS

| | | | |
|---|---|---|---|
| 3,552,773 | 5/1969 | Purrer et al. | 56/370 |
| 3,583,139 | 6/1971 | Pürrer | 56/370 |
| 3,827,224 | 8/1974 | Mulder et al. | 56/370 |
| 3,952,489 | 4/1976 | van der Lely | 56/370 |
| 4,026,093 | 5/1977 | Knusting et al. | 56/370 |
| 4,366,666 | 1/1983 | van der Lely et al. | 56/370 |
| 4,621,487 | 11/1986 | Urlacher et al. | 56/370 |

*Primary Examiner*—Stephen J. Novosad
*Assistant Examiner*—William P. Neuder
*Attorney, Agent, or Firm*—Oblon, Fisher, Spivak, McClelland & Maier

[57] ABSTRACT

A haymaking machine having a support frame (1) and several parts (2–4) to which raking wheels (12–15) are connected. Each lateral part (3, 4) of the support frame (1) has a pivoting axis (27) making it possible to change the position of the raking wheel (14, 15) which is fastened to that lateral part (3, 4) when that lateral part (3, 4) is moved around the pivot pin (5, 6) connecting it to the central part (2) of the support frame (1).

19 Claims, 12 Drawing Figures

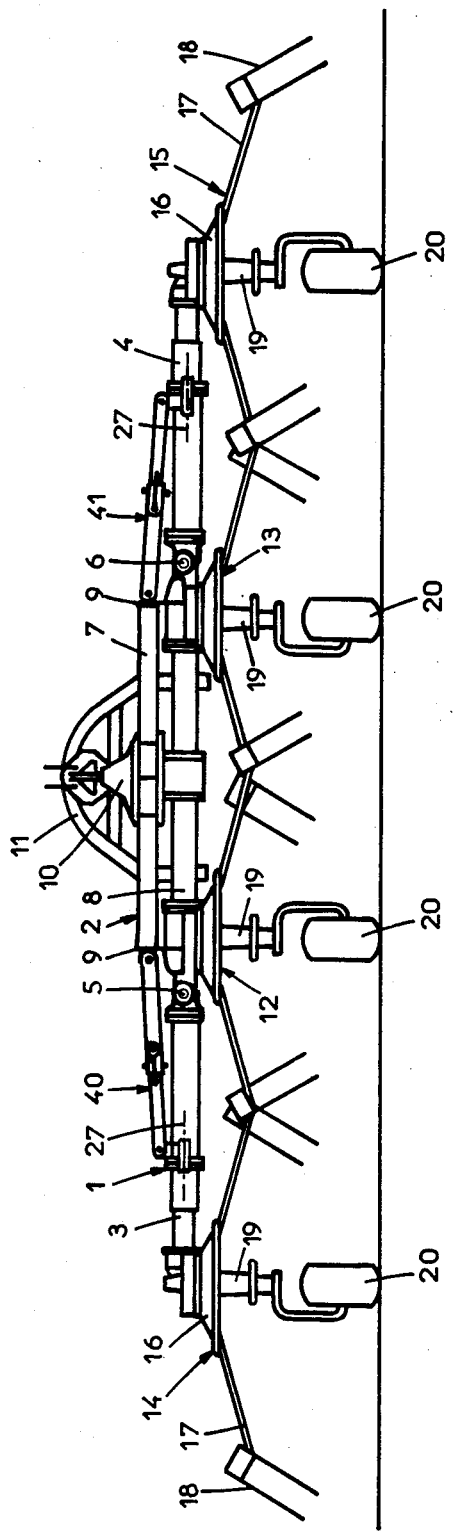
Fig:1

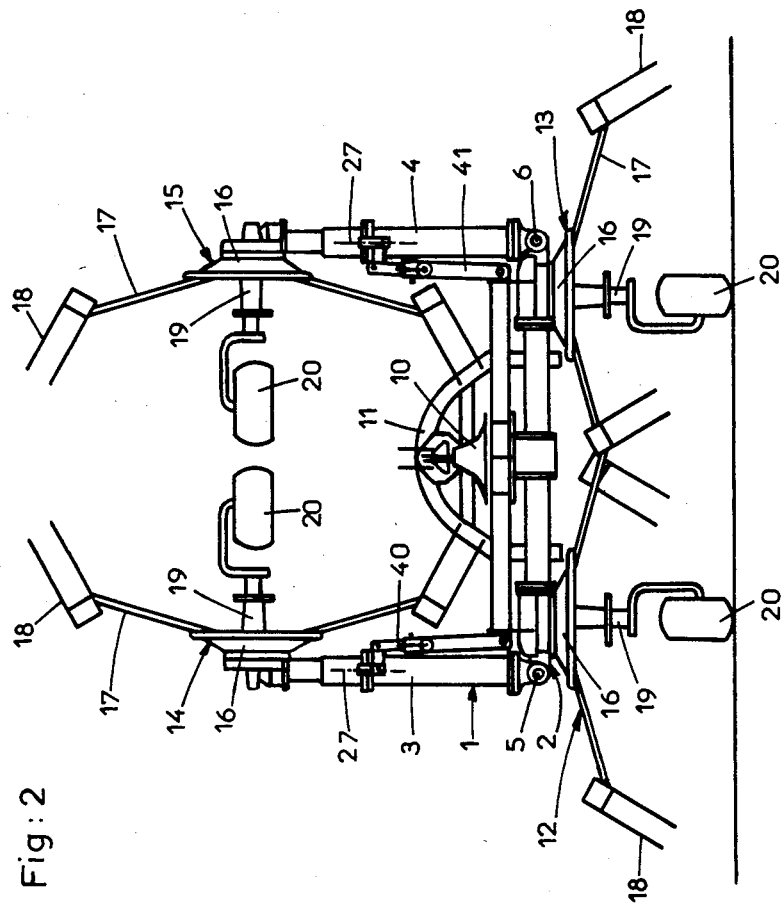

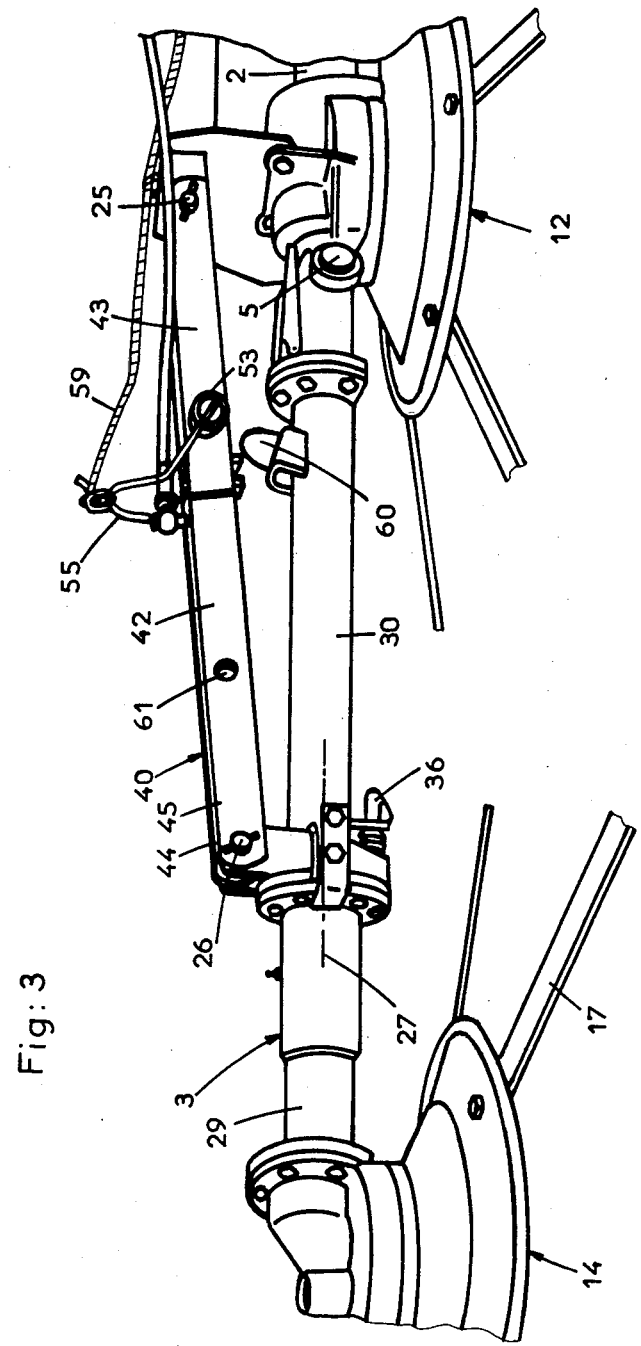
Fig: 3

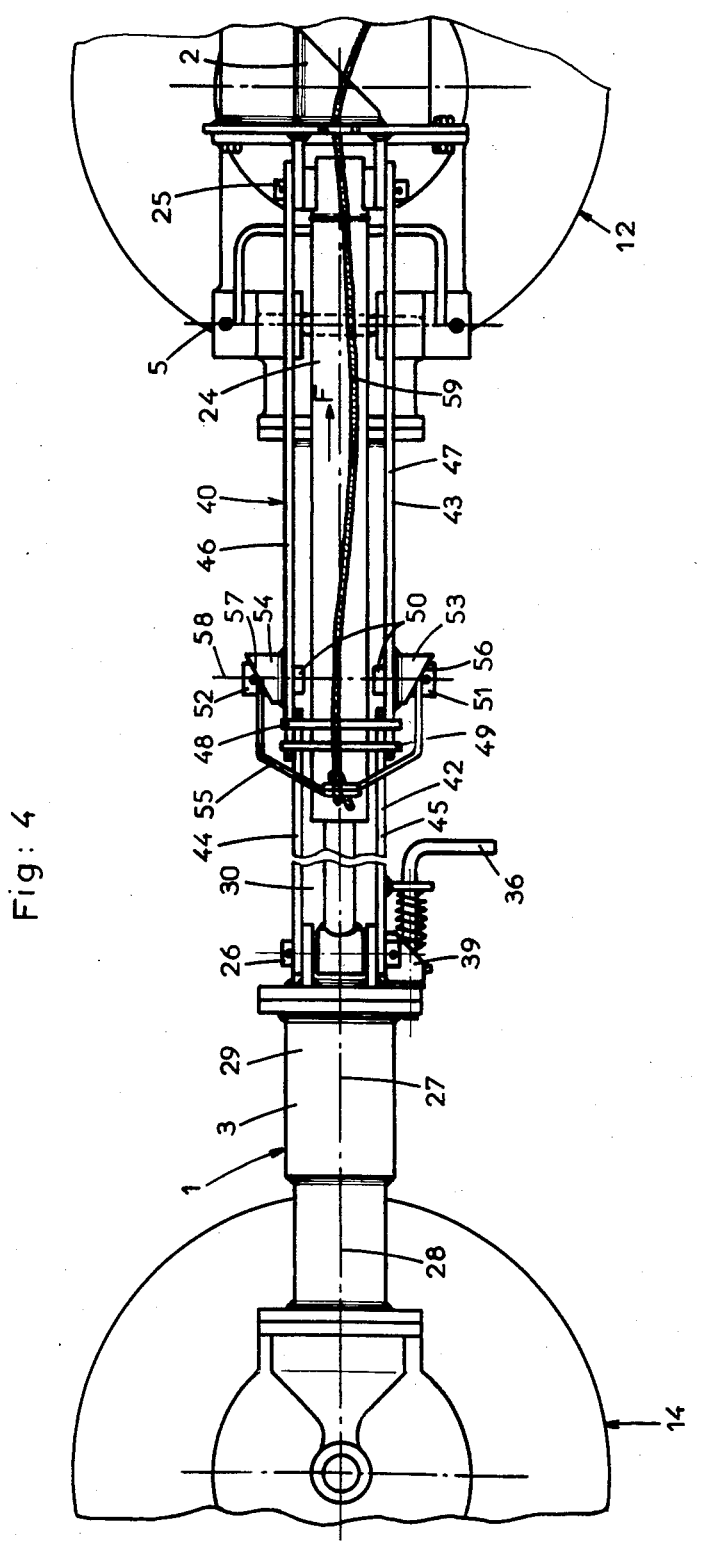
Fig: 4

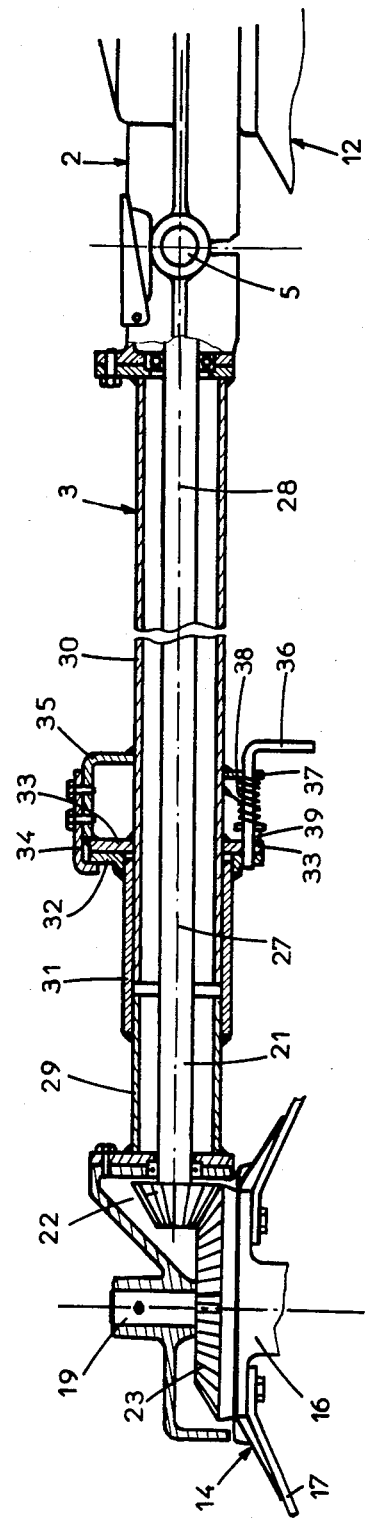
Fig: 5

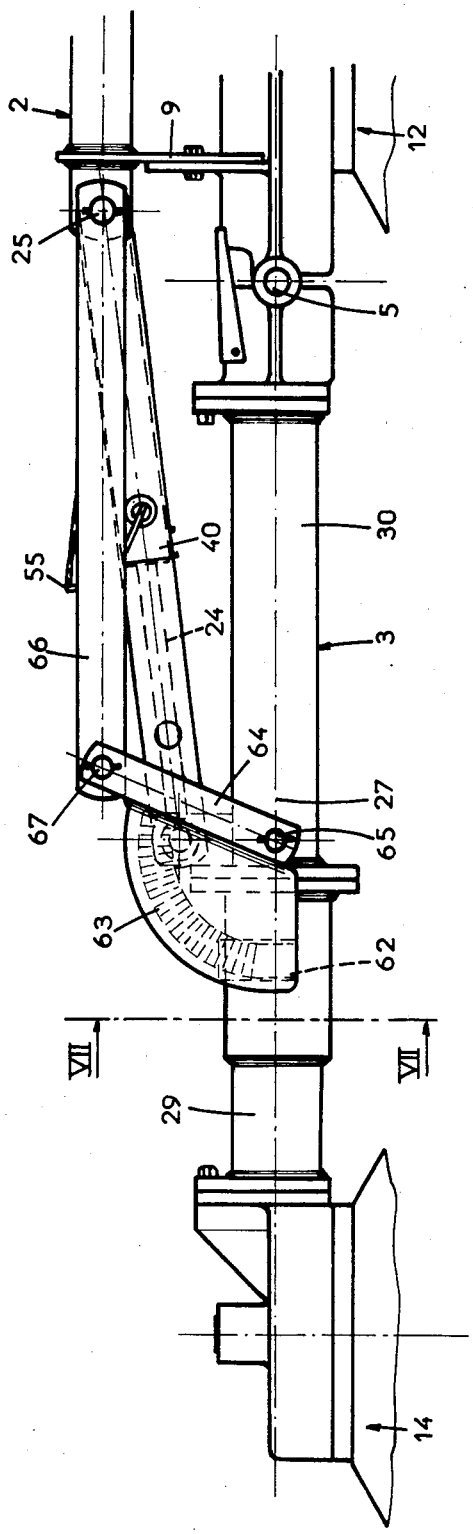
Fig: 6
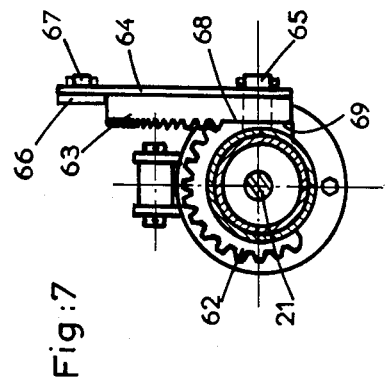
Fig:7

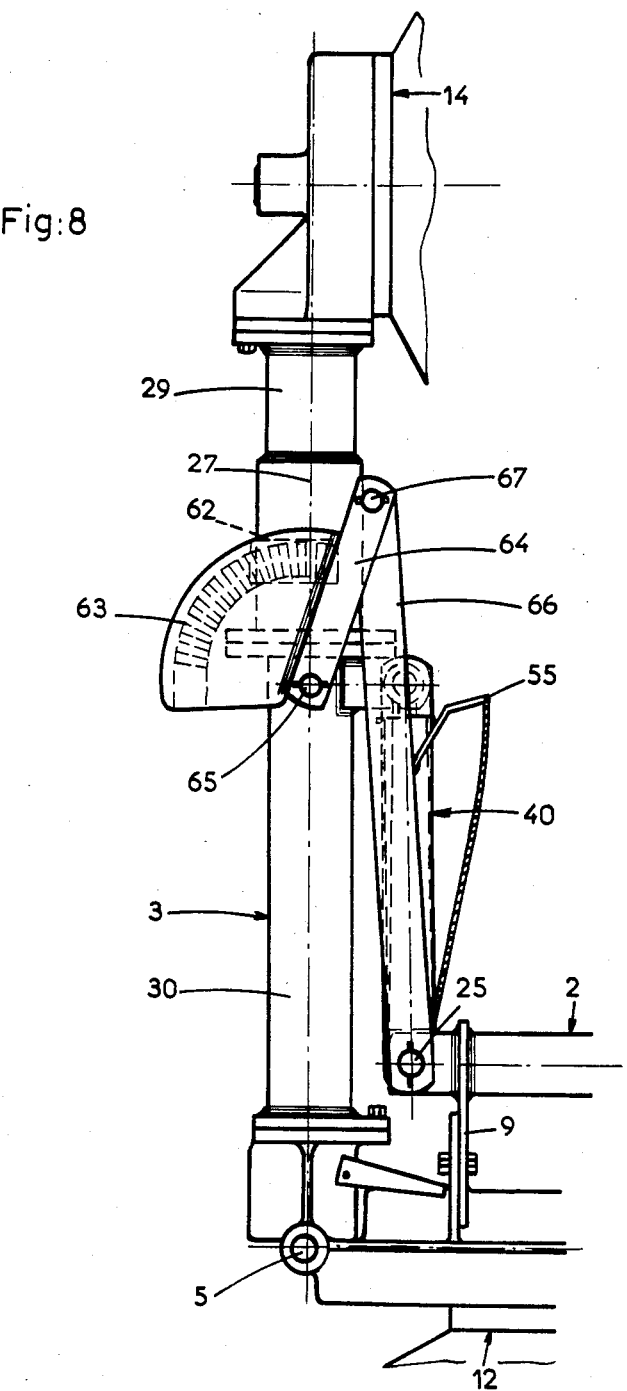
Fig: 8

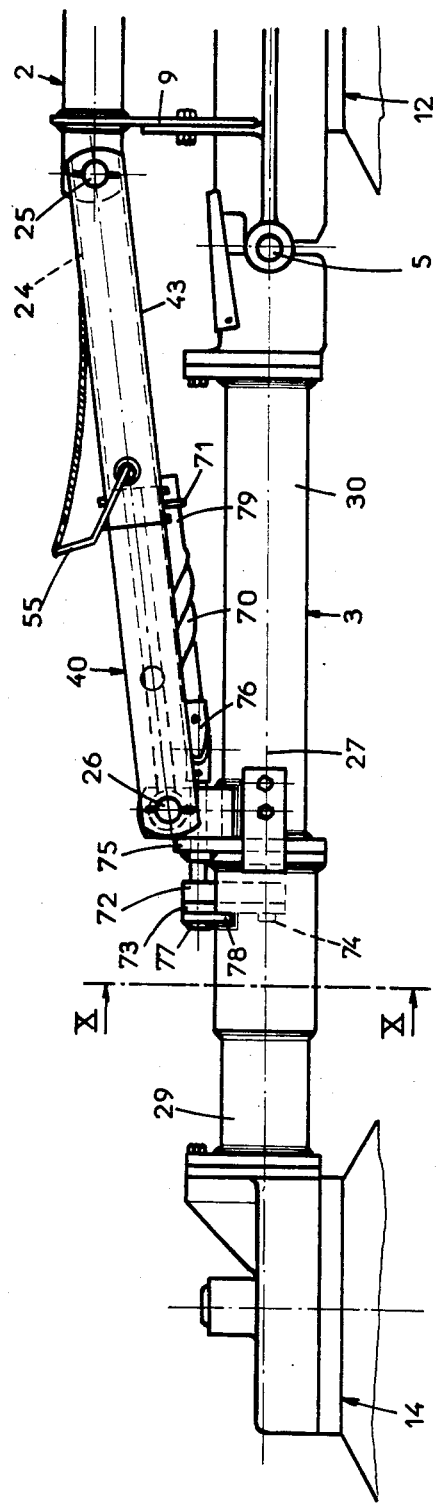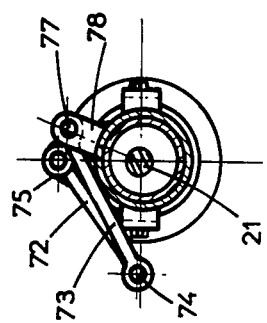

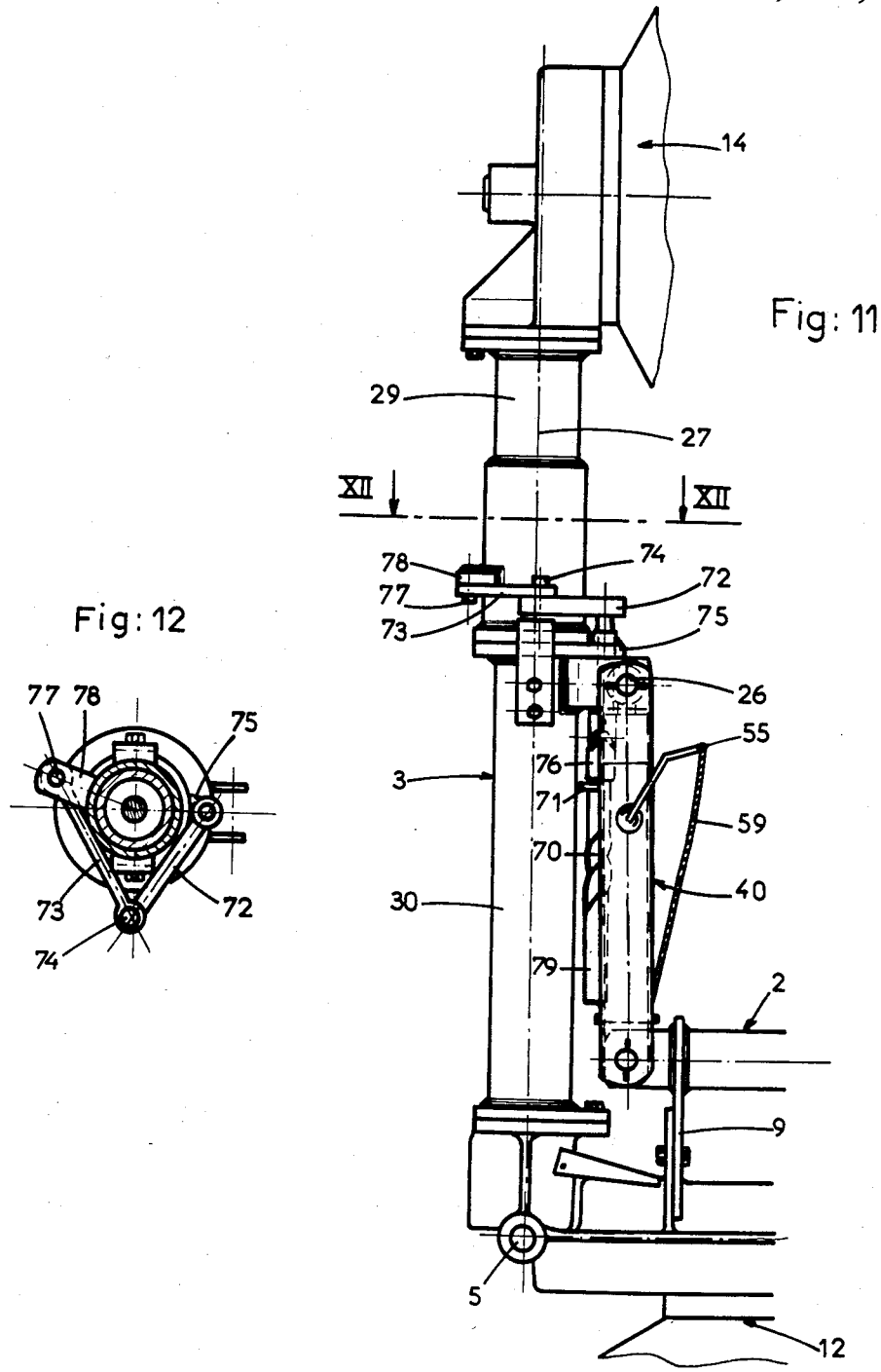

HAYMAKING MACHINE EQUIPPED WITH RAKING WHEELS

FIELD OF THE INVENTION

This invention relates to a haymaking machine comprising a support frame of elongated shape consisting of a central part to which at least one lateral part is articulated by a pivot pin. The support frame carries several raking wheels which can be driven in rotation during work around axes directed upwardly. At least one of the raking wheels is fastened to the at least one lateral part of the support frame.

BACKGROUND OF THE INVENTION

A known machine of this type comprises a frame consisting of a central part which carries two raking wheels and two lateral parts each of which carries a single raking wheel. For transport, each of the lateral parts can be rotated upwardly by an angle of about 90°. This rotation is performed round a pivot pin connecting each of the lateral parts to the central part of the frame. A hydraulic jack causes the rotation. In the transport position, the width of the machine is reduced in relation to the work position. However, the bulk of the machine is still relatively large, especially for moving on roads and for storage. Moreover, the work forks on the raking wheels are directed outwardly when the lateral parts are in the transport position. Thus, the work forks can cause considerable damage and injuries to anything (such as vehicles, human beings, or animals) which comes into contact with them, both when moving and when at rest.

OBJECTS OF THE INVENTION

The principal object of the invention is to offset the drawbacks described above.

In particular, it is an object of the invention to make possible a reduction of the bulk of the machine for transport and storage.

A further object of the invention is to reduce the danger incurred by nearness to the raking wheels on the lateral parts of the frame when they are in their transport positions.

SUMMARY OF THE INVENTION

An important characteristic of the invention consists in the fact that one or each lateral part of the frame of the machine has a pivoting axis that makes it possible to change the position of the raking wheel which is fastened to that lateral part when it is moved around the pivot pin connecting it to the central part of the frame.

According to a very advantageous embodiment of the invention, this pivoting axis is at least approximately parallel to the longitudinal axis of the lateral part of the support frame. The pivoting axis can also coincide with the longitudinal axis of the associated lateral part. Consequently, in the transport or storage position, one or each raking wheel which is attached to a lateral part of the frame can be brought close to the central part of the frame or even can be brought above the central part. This position is obtained by causing the raking wheel to rotate about 180 degrees around the pivoting axis. The bulk of the machine is thus considerably reduced. Moreover, the work forks are directed toward the center of the machine, rather than outwardly as on the known machine. In this position, almost all danger of collision with the work forks is eliminated.

According to another characteristic of the invention, the pivoting of one or each raking wheel which is fastened to a lateral part of the frame around its axis is combined with the pivoting of the lateral part around the approximately horizontal pivot pin which connects it to the central part of the frame. This combination makes it possible to obtain the ideal position for transport or storage by performing a single maneuver. Thus, a considerable gain of time is achieved. Moreover, safety is improved because the danger of transporting the machine when the work forks are directed outwardly is eliminated.

Other characteristics and advantages of the invention will become apparent from the following description and the accompanying drawings, which represent, by way of nonlimiting examples, several embodiments of the machine according to the invention.

BRIEF DESCRIPTION OF THE DRAWINGS

FIG. 1 shows a first embodiment of a machine according to the invention in its work position.

FIG. 2 shows the machine of FIG. 1 in its transport or storage position.

FIG. 3 shows, on a larger scale, a detailed view of a lateral part of the frame of the machine shown in FIG. 1.

FIG. 4 is a top view of the lateral part of the frame shown in FIG. 3.

FIG. 5 is a partial section of the lateral part of the frame shown in FIG. 3.

FIG. 6 shows a second embodiment of the lateral part of the frame in the work position.

FIG. 7 is a section along the plane VII—VII of FIG. 6.

FIG. 8 shows the second embodiment in its transport or storage position.

FIG. 9 shows a third embodiment of the lateral part of the frame in its work position.

FIG. 10 is a section along the plane X—X of FIG. 9.

FIG. 11 shows the third embodiment in its transport or storage position.

FIG. 12 is a section along the plane XII—XII of FIG. 11.

DETAILED DESCRIPTION OF THE PRESENTLY PREFERRED EMBODIMENTS

As represented in FIGS. 1 and 2, the machine according to the invention has a support frame 1 of elongated shape. The support frame 1 consists of a central part 2 and two lateral parts 3 and 4 which are articulated to the ends of the central part 2 by approximately horizontal pivot pins 5 and 6.

The central part 2 itself consists of 2 approximately parallel rails 7 and 8 which are connected to one another by two plates 9. To the rail 7 is connected a connecting beam 10 which extends approximately perpendicularly to the support frame 1 and the other end of which carries a hitching cradle 11. The hitching cradle 11 is equipped with three coupling points serving to attach the machine to the 3-point hitching device of a drive tractor (not shown).

In the examples shown, the central part 2 of the support frame 1 carries two raking wheels 12 and 13, while each of the lateral parts 3 and 4 carries a single raking wheel 14 and 15, respectively, at its end farthest away from the central part 2. The raking wheels 12 to 15 are located directly under the central part 2 and the lateral parts 3 and 4 of the support frame 1. The raking wheels 12 to 15 are all at least approximately identical. Each consists of a hub 16 to which several arm 17 carrying work forks 18 at their outer ends are fastened. Each hub 16 is mounted so as to be able to rotate on a stationary shaft 19 that is approximately vertical or inclined in the direction of advance of the machine. The stationary shafts 19 are connected to the support frame 1 and carry at their lower ends wheels 20 making it possible to move the machine over the ground during work.

In the work position (shown in FIG. 1), the four raking wheels 12 to 15 are approximately aligned. They are driven in rotation in a way known in the art from the power take-off shaft of the drive tractor. For this purpose, and as shown in FIG. 5, drive shafts 21 equipped with pinions 22 which cooperate with toothed wheels 23 connected to the hub 16 are housed in the lateral parts 3 and 4 and in the rail 8. Raking wheels 12 and 14 and the raking wheels 13 and 15 then rotate in convergence to the front—seen in the direction of advance. As a consequence of this rotation, the work forks 18 move the hay and provide a tedding of excellent quality. It is quite obvious that raking wheels intended to make windrows or that can perform both tedding and windrowing can be provided on this machine.

For transport or storage, the lateral parts 3 and 4 of the support frame 1 can be moved upwardly by an angle of about 90 degrees around the pivot pins 5 and 6 to the position shown in FIG. 2, thereby reducing the bulk of the machine. The movement of each of the lateral parts 3 and 4 is advantageously assured by a hydraulic jack 24 shown in FIG. 4. As may be clearly seen in FIG. 4, each hydraulic jack 24 is articulated to the central part 2 of the support frame 1 by a pin 25 and to the associated one of the lateral parts 3 or 4 by a pin 26. The actuation of the hydraulic jacks 24 is done advantageously from the tractor. The hydraulic jacks 24 can be double- or single-acting. In the latter case, the return of the lateral parts 3 and 4 to the work position is performed under the effect of their own weight. The drive shafts 21 of the outside raking wheels (i.e., the raking wheels 14 and 15) have articulations at the pivot pins 5 and 6, so as to be able to pivot with the lateral part 3 and 4 of the support frame 1.

According to an important characteristics of the invention, one or each lateral part 3 or 4 of the support frame 1 has a pivoting axis 27 that makes it possible to change the position of the raking wheel 14 or 15 which is fastened to that lateral part 3 or 4 when it is moved around the associated pivot pin 5 or 6. The pivoting around the pivoting axis 27 makes it possible to reduce the bulk of the machine more than is possible in the prior art. In addition, it makes it possible to change the orientation of the work forks 18 of the raking wheels 14 and 15 when they are raised, thereby reducing the danger of collision. In the case where only one of the raking wheels 14 and 15 can be oriented, it is advantageous that it be the one which is towards the center of the road during transport.

In the various examples shown in the accompanying figures, each pivoting axis 27 is approximately parallel to the longitudinal axis 28 of the associated lateral part 3 or 4. This position makes it possible to bring the raking wheels 14 and 15 close to the central part 2, or even to bring the raking wheels 14 and 15 above the central part 2, by simply causing each one of the raking wheels 14 and 15 to rotate about 180 degrees around the associated one of the pivoting axes 27. The width of the machine is thus reduced and the work forks 18 of the raking wheels 14 and 15 are oriented towards the center of the machine.

The pivoting axis 27 could also be positioned differently than in the described examples. For example, they could be inclined in relation to the longitudinal axis 28 of the corresponding lateral part 3 or 4 of the support frame 1, yet it would still be possible to attain the objects of the invention.

THE FIRST EMBODIMENT

Details of a particularly advantageous embodiment of the invention are shown in FIGS. 3–5. In this embodiment, the pivoting axis 27 of each raking wheel 14 and 15 coincides with the longitudinal axis 28 of the corresponding lateral part 3 or 4. As may be clearly seen in FIG. 5, in the first described embodiment of the invention, the corresponding lateral part 3 or 4 is made in two sections 29 and 30 fitted into one another. The outside section 29 (to which the raking wheel 14 or 15 is connected) can rotate in relation to the inside section 30 around the longitudinal axis 28. The outside section 29 has a sleeve 31 in which the outside end of the inside section 30 enters. The outside section 29 is equipped with a flange 32, and the inside section 30 is equipped with a flange 33. The flanges 32 and 33 form stops limiting the axial movement of the two sections 29 and 30. In addition, the outside section 29 is held axially by flanges 34 bolted to supports 35 welded to the inside section 30 and to the flange 33.

Moreover, the inside section 30 has a bolt 36 for the immobilization in rotation of the outside section 29 during work or transport. The bolt 36 is movable axially in a lug 37 mounted on the inside section 30 and in the flange 33 mounted on the inside section 30. The bolt 36 can be introduced into two openings provided in the flange 32 mounted on the outside section 29. These openings correspond respectively to the work position and to the transport and storage position of the outside section 29 and of the outside raking wheel 14 or 15 fastened thereon. The bolt 36 is held in its locking position by a spring 38 and in its unlocked position by a stop 39.

As shown in FIGS. 1 and 2, each lateral part 3 or 4 of the support frame 1 is associated with a control device 40 or 41 for controlling its movement around its pivot pin 5 or 6. The control devices 40 or 41 are preferably identical, and only the control device 40 (shown in FIGS. 3 and 4) will be described. The control device 40 consists of a sliding part 42 and a non-sliding part 43 that telescope during movement from the work position to the transport or storage position. The sliding part 42 consists of two rails 44 and 45, and the non-sliding part 43 consists of two rails 46 and 47. The sliding part 42 is articulated on the inside section 30 of the lateral part 3, while the non-sliding part 43 is articulated on the adjacent plate 9 of the central part 2. The articulations are provided by the pins 25 and 26, which also serve to articulate the associated one of the hydraulic jacks 24 as described above.

During movement of the lateral parts 3 and 4 of the support frame 1, the control devices 40 and 41 are retracted or extended, depending on whether the transport and storage position or the work position is selected. As shown in FIG. 4, to limit these movements, the sliding part 42 has a mobile stop 48 and the non-sliding part 43 has a fixed stop 49 and an adjustable stop 50.

In the work position, the mobile stop 48 is located between the adjustable stop 50 and the fixed stop 49 on the non-sliding part 43. During work, the mobile stop 48 can move between the fixed stop 49 and the adjustable stop 50, thereby making it possible for the lateral part 3 and the corresponding raking wheel 14 to follow the irregularities of the ground.

To be able to bring the lateral parts 3 and 4 of the support frame 1 into the transport and storage position, it is necessary previously to disengage the adjustable stop 50. This obligation avoids the accidental raising of the lateral parts 3 and 4. The adjustable stop 50 consist of two pins 51 and 52 mounted so as to be able to rotate and to slide axially in housings 53 and 54 provided on the rails 46 and 47 of the non-sliding part 43 of each control device 40 or 41. The pins 51 and 52 are connected to one another by a stirrup 55 which is used for their adjustment. The stirrup 55 is made like a spring, so that it pushes the pins 51 and 52 into the positions in which they limit the movement of the sliding part 42. This position is shown in FIG. 4. Each of the housings 53 and 54 has an inclined ramp 56 and 57, respectively. The inclined ramps 56 and 57 are symmetrical in relation to the longitudinal axis 28. Each of the legs of the stirrup 55 is pressed against one of the inclined ramps 56 and 57. Each of the legs of the stirrup 55 can be moved along the corresponding inclined ramp 56, 57 by simply pivoting the stirrup 55 around the common axis 58 of the pins 51 and 52. This pivoting can be effected by a cable 59 making it possible to pull the stirrup 55 in the direction indicated by the arrow F in FIG. 4. The cable 59 is advantageously accessible from the seat of the drive tractor.

During the movement of the two legs of the stirrup 55, they separate and move the pins 51 and 52 axially away from each other. The axial movement of the pins 51 and 52 frees the passage for the mobile stop 48 mounted on the sliding part 42 of the control device 40 or 41. The lateral parts 3 and 4 of the support frame 1 can then be raised into the transport position by the hydraulic jacks 24. This position is defined by stops 60 which limit the raising of the lateral parts 3 and 4. The stops 60 are provided on each of the lateral parts 3 and 4. In the transport and storage position, the raking wheels 14 and 15 can be oriented around their pivoting axes 27 as previously described.

When they are raised, the two lateral parts 3 and 4 of the support frame 1 can be locked in position by the same pins 51 and 52. For this purpose, the rails 44 and 45 of the sliding part 42 of each control device 40, 41 have opening 61 in which the ends of the pins 51 and 52 can be engaged as soon as the transport position is reached. This engagement is performed by a simple return of the stirrup 55 and consequently the pins 51 and 52 into the position that they occupy during work. This return is done automatically by sliding of the legs of the stirrup 55 along the inclined ramps 56 and 57. Such sliding is obtained after release of the cable 59 thanks to the constitution of the stirrup 55 as a spring.

To come back into the work position, it is enough to orient the raking wheels 14 and 15 by pivoting around their pivoting axes 27 and to unlock the sliding part 42 of the control devices 40 and 41 by withdrawing the pins 51 and 52 from the openings 61 by means of the stirrup 55. The lateral parts 3 and 4 of the support frame 1 can then be folded back around the pivot pins 5 and 6. This folding back can be obtained either under the effect of the weight of the lateral parts 3 and 4 or under the effect of the hydraulic jacks 24 if they are double-acting. During the changes of positions of the lateral parts 3 and 4, the pins 51 and 52 are kept in their out-of-service position by the rails 44 and 45 of the sliding parts 42 of the control devices 40 and 41.

THE SECOND EMBODIMENT

Details of the second embodiment of the invention are shown in FIGS. 6 to 8. In this embodiment, the pivoting of the raking wheel 14 and 15 around their pivoting axes 27 is combined with the movements of the lateral parts 3 and 4 around their approximately horizontal pivot pins 5 and 6. This combination facilitates the work of the user and assures that, during transport or storage, the machine is less bulky and exhibits maximum safety.

In the embodiment of FIGS. 6 to 8, the outside section 29 of each of the lateral parts 3 and 4 has a toothed sector 62 which surrounds it over about 180 degrees. A second toothed sector 63 in the shape of an arc of a circle cooperates with the toothed sector 62. The second toothed sector 63 is provided on a rod 64. The rod 64 is articulated at one end on the inside section 30 of the lateral part 3 or 4 by a pin 65 and at the other end on a rod 66 by a pin 67. The rod 66 is itself articulated on the central part 2 of the support frame 1 by the pin 25. Thus, when the lateral parts 3 and 4 of the support frame 1 are moved from the work position (shown in FIG. 6) into the transport and storage position (shown in FIG. 8) or conversely, around their pivot pins 5 and 6, a movement occurs of the toothed sectors 62 mounted on the outside sections 29 in relation to the second toothed sectors 63 mounted on the rod 64. Because of the meshing of the teeth, the toothed sectors 62 roll on the toothed sectors 63 and cause the pivoting of the outside sections 29 and the raking wheels 14 and 15 around their pivoting axes 27. Moreover, the toothed sectors 62 and 63 prevent any movement of the outside sections 29 of the lateral parts 3 and 4 of the support frame 1 in relation to the inside sections 30 in both the work position and in the transport and storage position.

It is seen in FIG. 7 that each toothed sector 62 has a smooth section 68 which is in contact with a smooth section 69 on the associated one of the second toothed sectors 63 when the machine is in its work position. The smooth sections 68 and 69 make it possible for the outside raking wheels 14 and 15 to follow the irregularities of the ground without their inclination in relation to the direction of advance being changed.

THE THIRD EMBODIMENT

Details of the third embodiment of the invention are shown in FIGS. 9 to 12. In this embodiment, a rod 70 twisted at least 180 degrees is used to combine the pivoting of each of the outside raking wheels 14 and 15 around its pivoting axis 27 with movement around the pivoting pins 5 and 6. The rod 70 is engaged in a guide 71 mounted on the non-sliding part 43 of the corresponding control device 40 or 41. The rod 70 and the opening in the guide 71 in which it is received both have a polygonal section. In the examples shown, the polygonal section is a square.

Moreover, each rod 70 is connected to the outside section 29 of the corresponding lateral part 3 or 4 of the support frame 1 by a crank 72 and a connecting rod 73 which are articulated to one another by a pin 74. The crank 72 is guided in a bearing 75 mounted on the inside section 30 of the corresponding lateral part 3 or 4 and is connected to the rod 70 by a universal joint 76. The universal joint 76 makes possible a modification of the position of the crank 72 in relation to the rod 70. The connecting rod 73 is itself articulated to the outside section 29 by a pin 77 that is at least approximately parallel to the section 29. The pin 77 is engaged in a lug 78 welded to the periphery of the outside section 29. The lug 78 is located on the side of the outside section 29 opposite the one on which the corresponding outside raking wheel 14 or 15 is located.

When the lateral parts 3 and 4 and the raking wheels 14 and 15 are moved around the pivot pins 5 and 6 to go from the work position (shown in FIG. 9) to the transport and storage position (shown in FIG. 11) or conversely, the rod 70 moves longitudinally in the guide 71. As a result of its twisting, the rod 70 rotates on itself during this movement. This rotational movement drives the crank 72, which exerts a pull on the connecting rod 73. That pull makes the outside section 29 and the corresponding outside raking wheel 14 or 15 rotate around the corresponding pivoting axis 27. Each outside raking wheel 14 or 15 thus undergoes a rotation of about 180 degrees. Accordingly, during transport and storage each raking wheel 14 or 15 occupies the position shown in FIG. 2. It is kept in the transport position by the rod 70 and the guide 71.

In the work position, the forces on the rod 70 are considerable because of the resistance of the hay and the friction of the work forks 18 on the ground. To limit these force, it is advantageous to arrange the unit consisting of the rod 70, the crank 72, and the connecting rod 73 so that, as shown in FIG. 10, in the work position, the connecting rod 73 rests against the outside section 29 of the corresponding lateral part 3 or 4 and so that the connecting rod 73 is located, in relation to the crank 72, on the side opposite the one on which it is in the transport and storage position. In this position, the connecting rod 73 and the crank 72 immobilize the outside section 29 like a knuckle and limit the forces that are exerted on the rod 70.

Each rod 70 has a straight part 79 at its end. The straight parts 79 make it possible for the outside raking wheels 14 and 15 to follow the irregularities of the ground during work without that movement causing a beginning of rotation around the pivoting axes 27.

It is quite obvious that the structure of the support frame 1 of the machine and the number of raking wheels can vary without going outside the scope of this invention. Also, various improvements, modifications, or additions can be made to the embodiments described above, and certain elements can be replaced with equivalents, without thereby going outside the scope of the invention.

What is claimed as new and desired to be secured by Letters Patent of the United States is:

1. (Amended) A haymaking machine comprising:
   (a) a support frame of elongated shape comprising a central part to which at least one lateral part having a longitudinal axis is articulated by a pivot pin around which said at least one lateral part can be moved upward for transport or for storage;
   (b) a plurality of raking wheels which can be driven in rotation during work around axes directed at least substantially upwardly, at least one of said plurality of raking wheels being fastened to said at least one lateral part of said support frame; and
   (c) pivoting means for pivoting inward said at least one of said plurality of raking wheels which is fastened to said at least one lateral part when said at least one lateral part is moved upwards around said pivot pin connecting it to said central part of said support frame.

2. A machine according to claim 1 wherein said pivoting means include a pivoting axis which is at least approximately parallel to the longitudinal axis of said at least part of said support frame.

3. A machine according to claim 1 wherein said pivoting means include a pivoting axis which coincides with the longitudinal axis of said at least one lateral part of said support frame.

4. A machine according to claim 3 wherein:
   (a) said at least one lateral part of said support frame is made in two sections fitted into one another and
   (b) the outside one of said two sections is able to rotate around its longitudinal axis in relation to the inside one of said two sections.

5. A machine according to claim 4 wherein said two sections are assembled by means of interfitting flanges.

6. A machine according to claim 4 wherein one of said two sections is equipped with a bolt for the immobilization in rotation of the outside one of said two sections.

7. A machine according to claim 1 wherein said support comprises two lateral parts with raking wheels, each one of said two lateral parts being equipped with pivoting means for pivoting inward said raking wheels.

8. A machine according to claim 1 and further comprising a control device for controlling the pivoting of said at least one lateral part of said support frame, said device being articulated on said central part of said support frame and on said at least one lateral part of said support frame and comprising:
   (a) a sliding part and a non-sliding part, said sliding part and said non-sliding part telescoping together;
   (b) a mobile stop mounted on one of said parts;
   (c) a fixed stop; and
   (d) an adjustable stop mounted on the other one of said parts in position to limit the travels of said at least one lateral part of said support frame, said adjustable stop comprising two pins which are connected to one another by a stirrup and which are axially slidable in housings provided on said non-sliding part.

9. A machine according to claim 8 wherein said sliding part has openings in which the ends of said two pins can be engaged to lock said at least one lateral part of said support frame in its transport and storage position.

10. A machine according to claim 1 wherein said pivoting means includes means for combining the pivoted movement of said at least one of said raking wheels with the upward movement of said at least one lateral part around said pivot pin.

11. A machine according to claim 10 wherein:
   (a) said at least one lateral part of said support frame is made in two sections fitted into one another and
   (b) the inward pivoting of said at least one raking wheel which is fastened to said at least one lateral part of said support frame is effected by two toothed sectors, one of which is provided on the outside one of said two sections and the other one of which is provided on a rod one end of which is articulated on the inside one of said two sections and the other end of which is articulated on a rod which is itself articulated on said central part of said support frame.

12. A machine according to claim 11 wherein each of said two toothed sectors has a smooth section, said smooth sections cooperating with one another when said at least one lateral part of said support frame is in its work position to accommodate unevenness of the ground.

13. A machine according to claim 10 wherein:
(a) the machine further comprises a control device for controlling the pivoting of said at least one lateral part of said support frame, said control device being articulated on said central part of said support frame and on said at least one lateral part;
(b) said control device comprises a sliding part and a non-sliding part, said siding part and said non-sliding part telescoping together;
(c) said at least one lateral part of said support frame is made in two sections fitted into one another; and
(d) the pivoting of said at least one raking wheel fastened to said at least one lateral part of said support frame is effected by a twisted rod connected to the outside one of said two sections, said twisted rod being engaged in a guide mounted on said non-sliding part of said control device.

14. A machine according to claim 13 where said twisted rod and the opening in said guide that receives said twisted rod each has a polygonal section.

15. A machine according to claim 13 wherein said twisted rod is connected to the outside one of said two sections by a crank articulated to a connecting rod, said connecting rod itself being articulated on said outside one of said two sections.

16. A machine according to claim 15 wherein a universal joint is disposed between said twisted rod and said crank.

17. A machine according to claim 13 wherein said twisted rod is twisted by at least 180 degrees.

18. A machine according to claim 13 wherein said twisted rod has a straight part, said straight part being sized, shaped, and positioned to cooperate with the opening in said guide that receives said twisted rod to accommodate unevenness of the ground.

19. A machine according to claim 15 wherein in the work position said connecting rod rests against the outside one of said two sections and is located, in relation to said crank, on the side opposite the one on which it is located in the transport position.

* * * * *

UNITED STATES PATENT AND TRADEMARK OFFICE
CERTIFICATE OF CORRECTION

PATENT NO. : 4,723,404
DATED : FEBRUARY 9, 1988
INVENTOR(S) : JEROME ARON

It is certified that error appears in the above—identified patent and that said Letters Patent is hereby corrected as shown below:

Column 7, line 56, Claim 1, delete "(Amended)".

Column 8, Claim 2, line 8, after "least" insert --one lateral--; Claim 7, line 26, after "port" insert --frame--; Claim 8, line 31, after third appearing "said" insert --control--.

Column 9, Claim 13, line 18, after "the" insert --inward--.

Column 10, Claim 14, line 1, delete "where" and insert --wherein--.

Signed and Sealed this

First Day of November, 1988

Attest:

DONALD J. QUIGG

Attesting Officer

Commissioner of Patents and Trademarks